US008753434B2

(12) United States Patent
Croll et al.

(10) Patent No.: US 8,753,434 B2
(45) Date of Patent: Jun. 17, 2014

(54) ZINC OXIDE CONTAINING FILTER MEDIA AND METHODS OF FORMING THE SAME

(71) Applicant: 3M Innovative Properties Company, St. Paul, MN (US)

(72) Inventors: Lisa M. Croll, Battersea (CA); Jeffrey R. Dahn, Upper Tantallon (CA); Jock W. H. Smith, Halifax (CA); Jennifer V. Romero, Beechville (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/051,634

(22) Filed: Oct. 11, 2013

(65) Prior Publication Data

US 2014/0045682 A1  Feb. 13, 2014

Related U.S. Application Data

(62) Division of application No. 12/941,280, filed on Nov. 8, 2010, now Pat. No. 8,585,808.

(51) Int. Cl.
 *B01D 53/02* (2006.01)
(52) U.S. Cl.
 USPC ........... 96/108; 95/900; 55/DIG. 35; 502/424
(58) Field of Classification Search
 USPC ............. 95/108; 210/656–749; 502/100–355, 502/400–438
 See application file for complete search history.

(56) References Cited

U.S. PATENT DOCUMENTS

| | | | |
|---|---|---|---|
| 1,519,470 A | 12/1924 | Wilson |
| 1,956,585 A | 5/1934 | Oglesby |
| 2,920,050 A | 1/1960 | Blacet |
| 2,920,051 A | 1/1960 | Wiig |
| 3,355,317 A | 11/1967 | Keith |
| 4,013,816 A | 3/1977 | Sabee |
| 4,215,682 A | 8/1980 | Kubik |
| RE31,285 E | 6/1983 | Van Turnhout |
| 4,588,537 A | 5/1986 | Klaase |
| 4,677,096 A | 6/1987 | Van der Smissen |
| 4,798,850 A | 1/1989 | Brown |
| 4,801,311 A | 1/1989 | Tolles |
| 5,063,196 A | 11/1991 | Doughty |
| 5,078,132 A | 1/1992 | Braun |
| 5,113,856 A | 5/1992 | Van der Smissen |

(Continued)

FOREIGN PATENT DOCUMENTS

| | | |
|---|---|---|
| EP | 0405404 | 1/1991 |
| FR | 1605363 | 2/1975 |

(Continued)

OTHER PUBLICATIONS

Grabenstetter, R.J. et al., *Military Problems with Aerosols and Nonpersistent Gases, Chapter 4: Impregnation of Charcoal*, by Division 10 Report of US National Defense Research Committee (1946) pp. 40-87.

*Primary Examiner* — Duane Smith
*Assistant Examiner* — Joubert X Glover
(74) *Attorney, Agent, or Firm* — Karl G. Hanson

(57) ABSTRACT

Filter media that includes activated carbon particulates and zinc oxide particles disposed on surfaces of the activated carbon particulates. The zinc oxide particles have an average crystallite dimension that is not greater than about 50 nm.

20 Claims, 3 Drawing Sheets

(56) References Cited

U.S. PATENT DOCUMENTS

| | | |
|---|---|---|
| 5,197,208 A | 3/1993 | Lapidus |
| 5,256,466 A | 10/1993 | Berringan |
| 5,492,882 A | 2/1996 | Doughty |
| 5,496,507 A | 3/1996 | Angadjivand |
| 5,597,540 A | 1/1997 | Akita |
| 5,656,368 A | 8/1997 | Braun |
| 5,696,199 A | 12/1997 | Senkus |
| 5,714,126 A | 2/1998 | Frund |
| 5,804,295 A | 9/1998 | Braun |
| 6,041,782 A | 3/2000 | Angadjivand |
| 6,123,077 A | 9/2000 | Bostock |
| 6,234,171 B1 | 5/2001 | Springett |
| 6,290,685 B1 | 9/2001 | Insley |
| 6,344,071 B1 | 2/2002 | Smith |
| 6,375,886 B1 | 4/2002 | Angadjivand |
| 6,406,657 B1 | 6/2002 | Eitzman |
| 6,454,986 B1 | 9/2002 | Eitzman |
| 6,743,464 B1 | 6/2004 | Insley |
| 6,824,718 B2 | 11/2004 | Eitzman |
| 6,908,874 B2 | 6/2005 | Woodhead |
| 6,959,712 B2 | 11/2005 | Bereman |
| 7,004,990 B2 | 2/2006 | Brey |
| RE39,493 E | 2/2007 | Yuschak |
| 7,309,513 B2 | 12/2007 | Brey |
| 7,425,521 B2 | 9/2008 | Kaiser |
| 8,293,333 B2 | 10/2012 | Croll |
| 2004/0259729 A1* | 12/2004 | Kaiser et al. ............... 502/417 |
| 2006/0096911 A1 | 5/2006 | Brey |
| 2006/0254427 A1 | 11/2006 | Trend |
| 2008/0271602 A1* | 11/2008 | Tatarchuk et al. ............ 95/135 |
| 2009/0215345 A1 | 8/2009 | Brey |
| 2010/0037774 A1 | 2/2010 | Nielsen |
| 2010/0122708 A1* | 5/2010 | Sears et al. ................ 131/344 |

FOREIGN PATENT DOCUMENTS

| | | |
|---|---|---|
| JP | 73-24984 | 8/1971 |
| JP | 09066231 | 3/1997 |
| JP | 2003-268386 | 9/2003 |
| WO | WO 96-28216 | 9/1996 |
| WO | WO 2006-119654 | 11/2006 |

* cited by examiner

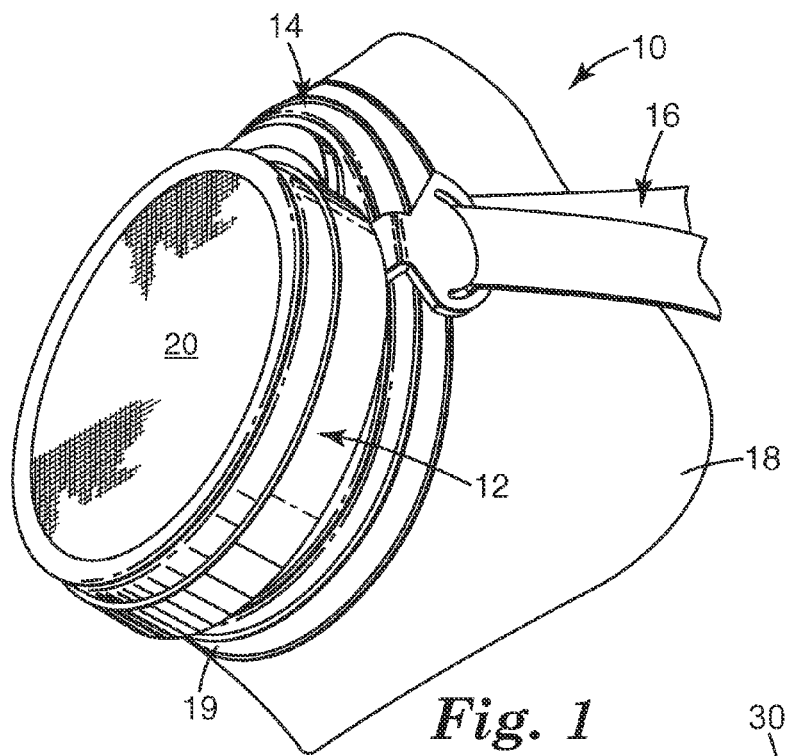
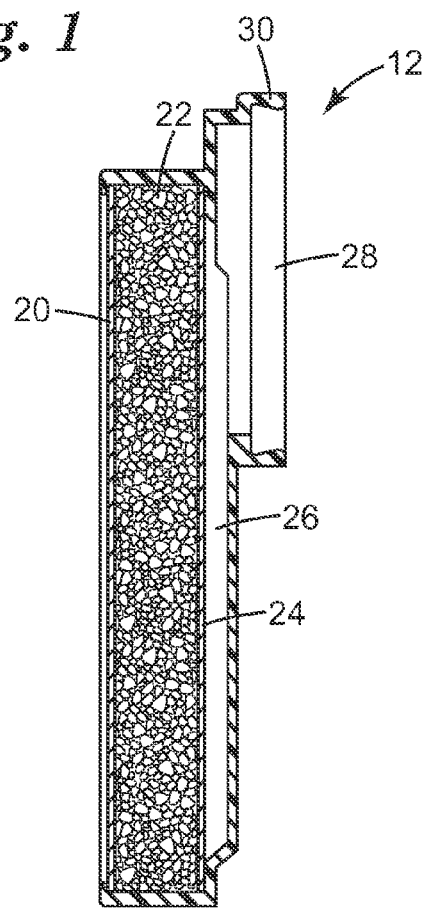
*Fig. 1*
*Fig. 2*

ZINC OXIDE CONTAINING FILTER MEDIA AND METHODS OF FORMING THE SAME

CROSS-REFERENCE TO RELATED APPLICATION

This application is a divisional of U.S. Ser. No. 12/941,280 filed on Nov. 8, 2010, now U.S. Pat. No. 8,585,808.

BACKGROUND

Activated carbon, alumina, zeolites, and the like, are widely used in filtration appliances. These types of materials are sometimes referred to collectively as "active particulate"—see U.S. Pat. No. 5,696,199 to Senkus et al.—because of their configuration and innate ability to interact with fluids by sorbing (adsorbing and absorbing) components in the fluid. Their good filtration properties arise from a highly porous or convoluted surface structure, which provides an increased surface area.

Activated carbon, in particular, is widely used to protect persons from inhaling a variety of toxic or noxious vapors, including poisonous gases, industrial chemicals, solvents, and odorous compounds. Its surface porosity typically results from a controlled oxidation during manufacture. Activated carbon is derived, for example, from coal or coconut shells and can be produced in the form of powders, granules, and shaped products. It is commonly used in individual canisters or pads for gas masks. Important properties of commercial activated carbon products include those related to their particle size as well as their pore structure.

Although commonly used in many filters, activated carbon does not have a great capacity to remove gases and vapors that have low boiling points. Treatments therefore have been devised where chemicals are placed on the carbon surface and within the carbon pores to provide enhanced filtration capabilities for such gases and vapors. These treatment processes are generally known as "impregnation" methods, and the result of the treatment is an impregnated activated carbon.

Various impregnants have been developed for removing a wide range of chemicals. In industry—where the nature of the hazard is known in advance—the practice has been to select an appropriate filter for the known hazard. Consequently, filters that are effective at removing a specific chemical type or class are often used in industrial applications.

Over time, regulatory structures for the selection and use of respiratory protective equipment have evolved, along with approval systems, to ensure that the equipment designs are capable of meeting necessary performance requirements. The European Standard (EN) system has been adopted widely in Europe and elsewhere. Another example is the National Institute for Occupational Safety and Health (NIOSH), which has been adopted in the USA, Canada, and certain other countries.

For emergency responders, filtration-based protection systems are appropriate for personnel undertaking various tasks close to a point of a chemical release. Although a quick response is often desirable, delay may be inevitable if the responders need to first identify the toxic component in the surrounding air in order to select an appropriate filter. To avoid carrying an inventory of many different filters, it is beneficial to have one filter type, which can provide protection against various hazards.

The first U.S. patent that described a treated carbon, which removed a variety of gases arose from developments to protect personnel in World War I battles where chemical agents were used. The 1924 patent by Robert E. Wilson and Joshua C. Whetzel (U.S. Pat. No. 1,519,470) describes several methods of impregnating granular activated carbon with metals and their oxides. For most purposes, the preferred impregnants were metallic copper and copper oxides. The products made by the method described in this patent later became known as "whetlerites". Workers at Edgewood Arsenal made subsequent progress in techniques for copper impregnation, and by the early 1940s, a copper impregnated carbon, designated "Type A" whetlerite, was the standard canister fill for US military masks. This sorbent was prepared by treating activated carbon with copper ammine carbonates in an ammonia solution. When the treated carbon was heated to 150° C. or higher, the ammine carbonates decomposed to form copper oxides in the carbon pores. Ammonia and carbon dioxide were liberated during drying. The oxide impregnant acted as an oxidizing and basic medium for the retention of acidic or oxidizable gases and vapors. The preparation of an impregnated carbon particulate of this type is described in U.S. Pat. No. 1,956,585 to Oglesby et al. It is now known, however, that active particulates treated with such copper compounds can react with hydrogen cyanide (HCN) to generate cyanogen (NCCN), an equally toxic gas. Other variations on the Wilson et al. technique have been developed—see, for example, the following patents: U.S. Pat. No. 2,920,051, DE 1,087,579, FR 1,605,363, JP 7384,984, and CZ 149,995.

In a particular advance over the 1924 Wilson et al. activated carbon, chromium (VI) salts were used to aid in removal of the NCCN generated by reaction of HCN with copper based salts—see U.S. Pat. Nos. 1,956,585 and 2,920,050. In recent years, however, the use of such Cr-based materials has been limited by both environmental and health concerns. An in depth report on impregnant formulations can be found in "Military Problems with Aerosols and Nonpersistent Gases", Chapter 4: "Impregnation of Charcoal", by Grabenstetter, R. J., and Blacet, F. E., Division 10 Report of US National Defense Research Committee (1946) pp. 40-87. The favorable properties obtained by using chromium also can be realized by the use of metals such as molybdenum, vanadium, or tungsten. Whetlerites containing these metals are described in several patents, including U.S. Pat. Nos. 4,801,311 and 7,004,990.

Subsequent research also has explored shelf life improvements using impregnated organic compounds on carbon. One material found to improve shelf life towards a cyanogen chloride (CK) challenge is triethylenediamine (also known by other names such as TEDA, DABCO, or 1,4-diazabicyclo [2.2.2]octane). When impregnated on carbon, TEDA has been found to be capable of reacting directly with cyanogen chloride and to be capable of removing methyl bromide and methyl iodide.

In 1993 Doughty et al. (U.S. Pat. No. 5,492,882) described the use of copper carbonates and sulfates in the presence of zinc and molybdenum oxides. This formulation was an advancement over the Wilson et al. work and others because it incorporated molybdenum oxides, which increased capacity for the HCN reaction product NCCN and avoided the use of chromium found in earlier versions. In addition, Doughty et al. removed basic gases such as ammonia. As discussed below, the Doughty et al. method is generally limited by its utilization of ammoniacal solutions and salts during the impregnation process. These chemicals and solutions are generally expensive to handle on a manufacturing scale because specialized ventilation and scrubbing equipment is required to meet health and safety concerns and environmental release standards.

In U.S. Pat. No. 7,309,513, Brey et al. presented an advance by replacing the relatively expensive molybdenum compounds with tungsten while retaining the ability to remove NCCN and other basic gases such as ammonia. Despite this advance, Brey et al. also relied on the use of ammonia-based salts and solutions to impregnate metal into activated carbon and other substrates.

SUMMARY

Disclosed herein is a filter media that includes activated carbon particulates; and zinc oxide particles disposed on surfaces of the activated carbon particulates, wherein the zinc oxide particles have an average crystallite dimension that is not greater than about 50 nm.

Also disclosed herein is a filter for removing contaminants from air, the filter including a layer of an impregnated active particulate, wherein the impregnated active particulate includes activated carbon particulates; and zinc oxide particles disposed on surfaces of the activated carbon particulates, wherein the zinc oxide particles have an average crystallite dimension that is not greater than about 50 nm.

Also disclosed is a method of making a filter media, the method including providing an impregnation solution comprising zinc nitrate; contacting a substrate with the impregnation solution to impregnate the zinc nitrate on the substrate; and heating the impregnated solution to convert the zinc nitrate to zinc oxide.

BRIEF DESCRIPTION OF THE DRAWINGS

The disclosure may be more completely understood in consideration of the following detailed description of various embodiments of the disclosure in connection with the accompanying drawings, in which:

The figures are not necessarily to scale. Like numbers used in the figures refer to like components. However, it will be understood that the use of a number to refer to a component in a given figure is not intended to limit the component in another figure labeled with the same number.

FIG. 1 is an example of a respirator 10 that may use a filter cartridge 12 as disclosed herein;

FIG. 2 is a cross-section of the filter cartridge 12 that may be used as disclosed herein;

DETAILED DESCRIPTION

Figure 3:
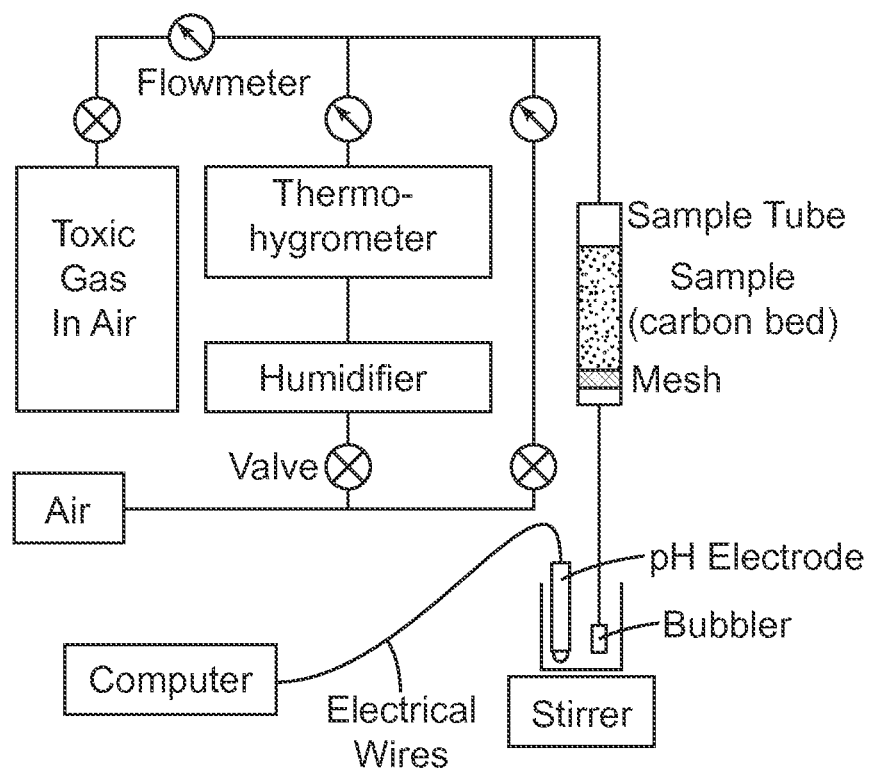
FIG. 3 is a schematic drawing of the tube-testing apparatus that is used for $SO_2$, $NH_3$, and HCN Breakthrough testing.

In the following description, reference is made to the accompanying drawing that forms a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Disclosed herein are filter media and methods of forming filter media. Disclosed filter media can be utilized to remove gases from a contaminated air stream. Exemplary disclosed filter media can be utilized to remove organic vapors, acidic components, basic components, and cyanide gases from a contaminated air stream. Disclosed filter media can be advantageous because they can offer enhanced filtration properties, can be economical to produce, do not produce undesirable components during filtration, or some combination thereof.

Methods as disclosed herein can generally be utilized to form or make filter media. Exemplary disclosed methods can include the steps of providing an impregnation solution, contacting a substrate with the impregnation solution forming an impregnated substrate, and heating the impregnated substrate. The step of providing an impregnation solution can include obtaining an impregnation solution, forming an impregnation solution, purchasing an impregnation solution, or the like.

An impregnation solution is generally an aqueous solution. The term "aqueous solution", as utilized herein refers to a homogeneous mixture that contains water and one or more solutes. In embodiments, impregnation solutions that can be utilized herein do not include a significant amount of ammonia ($NH_3$). A "significant amount of ammonia" in an impregnation solution generally refers to an amount of ammonia that would be large enough to enable ammonia to be detected in the solution or in the resulting impregnated substrate utilizing commonly utilized techniques for the detection of ammonia.

Generally, an impregnation solution utilized herein includes zinc nitrate ($ZnNO_3$). Zinc nitrate and its hydrates (e.g. $Zn(NO_3)_2 \cdot 6H_2O$) are generally solids at room temperature and can be dissolved in water at room temperature. The impregnation solution can include various concentrations of zinc nitrate. In embodiments, the impregnation solution can include from about 0.5 M (molar=moles $ZnNO_3$/liters aqueous solution) to about 5 M zinc nitrate. In embodiments, the impregnation solution can include from about 1 M to about 3 M zinc nitrate. In embodiments, the impregnation solution can include from about 2.2 M to about 2.6 M zinc nitrate.

Impregnation solutions utilized to contact exemplary substrates discussed herein can also optionally include other components. In embodiments, an impregnation solution can include nitric acid ($HNO_3$). If included in an impregnation solution, the nitric acid can be added before the zinc nitrate, after the zinc nitrate, or simultaneously with the zinc nitrate. Nitric acid is generally utilized as an aqueous solution and can have any convenient concentration. When included in an impregnation solution, the impregnation solution can have a nitric acid concentration of at least about 0.5 M (moles nitric acid/liter of impregnation solution). In embodiments where nitric acid is included in an impregnation solution, the nitric acid can have a concentration of at least about 2.0 M. In embodiments where nitric acid is included in an impregnation solution, the nitric acid can have a concentration of at least 4.0 M.

It is thought, but not relied upon, that the addition of nitric acid to an impregnation solution can affect the substrate. For example, in embodiments where an impregnation solution containing nitric acid is contacted with activated carbon as the substrate, the nitric acid may oxidize the surface of the activated carbon. Oxidation of the activated carbon can cause the activated carbon to form surface functional groups that lower the contact angle of the impregnating solution during the drying process. This can lead to the spreading of the solution during drying and to the formation of a well-distributed impregnant.

Exemplary impregnation solutions may also contain other non-zinc, zinc based materials, or combinations thereof, in order to render the filter media suitable for removing other contaminants. Examples of such other materials that can be utilized include for example, $Cu(NO_3)_2$, $CuCl_2$, $Fe(NO_3)_3$, $Al(NO_3)_3$, $FeCl_2$, $FeCl_3$, $Ca(NO_3)_2$, $ZnCl_2$, Zinc acetate, Copper acetate, etc and combinations, or hydrates thereof. Optionally, other salts including soluble silver salts and soluble salts comprising polyoxometallates of molybdate or tungstate anions wherein the metal-oxo anion portion of the salts contain greater than two molybdenum or tungsten atoms or a combination of more than two molybdenum and tungsten atoms. In addition to molybdenum and tungsten, the impregnation solution may also optionally contain an additional element, for example, cobalt, boron, silicon, phosphorus, germanium, and/or iron. In embodiments, this additional element can be silicon or phosphorus. Such optional non-zinc based materials can be included in the same impregnation solution as the zinc nitrate or can be contacted with the substrate via a second (or subsequent) impregnation solution.

Specific, exemplary salts that can optionally be included in the impregnation solution or a second (or subsequent impregnation solution) include for example salts having compositions of the stoichiometries $H_3PMo_{12}O_{40} \cdot xH_2O$, $H_3PW_{12}O_{40} \cdot xH_2O$, $Na_3PW_{12}O_{40} \cdot xH_2O$, $Na_2PW_{12}O_{40} \cdot xH_2O$, $Na_3PMo_{12}O_{40} \cdot xH_2O$, $Na_3SiMo_{12}O_{40} \cdot xH_2O$, $H_4SiW_{12}O_{40} \cdot xH_2O$, $H_4SiMo_{12}O_{40} \cdot xH_2O$, $(NH_4)_6H_2W_{12}O_{42} \cdot xH_2O$, $(NH_4)_6H_2W_{12}O_{40} \cdot xH_2O$, and $(NH_4)_6Mo_7O_{24} \cdot 4H_2O$, where x represents a variable number of waters of hydration. The cation portion of these salts can include any cation that allows solubility of the polyoxometallate anion in water. These cations can include alkaline metal cations such as $Na^+$, $K^+$ and $Li^+$, as well as ammonium and hydronium cations and combinations of these cations. The optional non-zinc based salts can also include those that generate phosphomolybdate, phosphotungstate, silicomolybdate or silicotugstate anions in solution.

Optional, non-zinc based materials may be included in the impregnation solution, or a subsequent impregnation solution in concentrations from 0.001 M to 5 M. In embodiments, non-zinc salts can optionally be included in impregnation solutions in concentrations from 0.02 M to 3 M.

Additionally, the substrate can also optionally be treated with other materials. For example, one or more higher molecular weight amine functional impregnants may be beneficially incorporated. These materials can be described as higher molecular weight amines since they have molecular weights much higher than that of ammonia (molecular weight of 17) and as such have a lower volatility. Suitable amines can either be a solid or a liquid at room temperature and can be applied to the substrate by spraying from an aqueous solution, spraying a pure liquid or by sublimation, depending on the initial state of the amine Amines tend to provide cyanogen chloride (CK), methyl bromide, and/or methyl iodide removal capability. Representative examples of suitable amines include for example triethylenediamine (TEDA), triethylamine (TEA), pyridine, pyridine-4-carboxylic acid (P4CA), combinations thereof, and the like. In embodiments, TEDA can be particularly suitable for CK removal. The amount of amine incorporated into the substrate may vary within a wide range. Generally if too little is used, the CK lifetime of the resultant filter may be below what is desired. On the other hand, using too much amine may tend to unduly degrade the capacity of the filter to remove organic vapors from the air or other gases. Additionally, above some impregnation level, little additional benefit may be observed by the use of more amine. Balancing these concerns, the filter can generally optionally include from about 0.5 to 15 weight percent of amine based upon the total weight of the impregnated substrate material; or in some embodiments from about 1 to 5 weight percent of amine based upon the total weight of the impregnated substrate material.

An impregnation solution, such as those discussed above is contacted with a substrate. The substrate can typically have a surface that is sufficiently convoluted or porous. In embodiments, the substrate can be porous on a microscopic and/or macroscopic level, such that the substrate is capable of being impregnated with at least about 5%, typically at least about 10%, more typically at least about 15% or more by weight on a cumulative basis of at least zinc oxide. Exemplary substrates can include for example woven or nonwoven fabric, bonded, fused, or sintered block, extended surface area particles, and/or the like. Suitable extended surface area substrate particles can have BET specific surface areas of at least about 85 square meters per gram ($m^2/g$); in embodiments from about 500 $m^2/g$ to 2000 $m^2/g$; and in embodiments about 900 $m^2/g$ to about 1500 $m^2/g$. The BET specific surface area of particles may be determined by a procedure described in ISO 9277:1995, incorporated herein by reference in its entirety.

The active particulate substrates typically may have microporous, mesoporous, and/or macroporous characteristics as such are defined in applicable provisions of IUPAC Compendium of Chemical Technology, 2nd Ed. (1997). A typical population of particulates tends to include a combination of microporous, mesoporous, and macroporous properties. Typically, at least a portion of the active particulate is macroporous, for example when the filter media particles are formed by a method that comprises the steps of solution impregnation. In such embodiments, the impregnants are able to impregnate more thoroughly and completely into the pore structure of the substrate.

Extended surface area substrates may have any of a wide range of sizes. Substrate particle size in the filter industry can be expressed in terms of a mesh size. A typical expression for mesh size is given by "a×b", wherein "a" refers to a mesh density through which substantially all of the particles would fall through, and "b" refers to a mesh density that is sufficiently high so as to retain substantially all of the particles. For example, a mesh size of 12×30 means that substantially all of the particles would fall through a mesh having a mesh density of 12 wires per inch, and substantially all of the particles would be retained by a mesh density having a density of 30 wires per inch. Active particulates characterized by a mesh size of 12×30 would include a population of particles that have a diameter of about 0.5 to 1.5 mm.

Selecting an appropriate mesh size for the substrate particles involves balancing density and filter capacity against air flow resistance. Generally, a finer mesh size (i.e., smaller particles) tends to provide not only greater density and filter capacity, but higher air flow resistance. Balancing these concerns, "a" can typically be about 5 to 20 and "b" can typically be about 15 to about 40, with the proviso that the difference between a and b is generally in the range from about 5 to about 30. Specific exemplary mesh sizes that have been found to be suitable can include 12×20, 12×30, 12×35, 12×40 and 20×40 for example. However, finer particles such as 40×140 and 60×325 may be incorporated into filters as trimming layers. These fine particles may be incorporated as a granular layer or supported in some way, such as in United States Patent Publication No. 2008/0519173 (Brey et al.).

Representative examples of extended surface area substrates include active particulates such as activated carbon, zeolite, alumina, silica, particulate catalyst supports, combinations of these, and the like. In embodiments, more than one type of substrate may be used in a single filter media. In embodiments, more than one type of active particulates may be used in a single filter media. In embodiments, the substrate can include an active particulate such as activated carbon. Exemplary types of activated carbon can be derived from a wide variety of source(s) including for example coal, coconut, peat, combinations thereof, and the like. An exemplary commercially available activated carbon that can be utilized herein can include for example Kuraray GC available from Kuraray Chemical Co., Ltd., Osaka, Japan. The substrate utilized in filter media could also include a microreplicated surface having the structure described, for example, in U.S. Pat. No. 6,290,685 to Insley et al. In embodiments, a substrate can optionally be conditioned or treated before being impregnated with a zinc nitrate containing solution.

The impregnation solution containing at least zinc nitrate is generally contacted with the substrate. The substrate may be contacted with the impregnation solution by, for example, soaking the substrate in the impregnation solution. As an alternative to soaking or immersing the substrate in the impregnation solution(s), spraying techniques can also be used. Generally, a spraying technique can include spraying the respective solutions onto the substrate to impregnate the zinc nitrate thereon. In addition, the substrate could be contacted with the impregnation solution(s) by feeding it through a bath using a screw feeder. A shaking apparatus or mixing device also could be used to ensure good contact between the substrate and the impregnation solution. The impregnation solution can typically be applied up to the "imbibing limit", which is the point at which the surface of the substrate constituent(s) is fully wetted. The imbibing limit is the maximum amount of impregnation solution that can be applied without causing run-off, similar to a sponge being full but not overflowing. The imbibing limit can also be referred to as the incipient wetness point. Once a substrate has been contacted with at least one impregnation solution containing zinc nitrate, the substrate can be referred to as an impregnated substrate.

Embodiments of methods can include the use of more than one impregnation solution. When more than one impregnation solution is utilized, the impregnation solutions can be contacted with the substrate in a single step process or a multistep process. A multistep process can utilize the same contact techniques for the two or more impregnation solutions or can utilize different contact techniques for the two or more impregnation solutions.

In multistep processes utilizing two or more impregnation solutions, the substrate can be dried after contact with each impregnation solution or can be dried only after the final impregnation. Drying may require further handling of the substrate, which, in turn, may cause abrasion, which can detrimentally affect the filter performance. Thus, the number of drying steps is desirably kept to a minimum. In embodiments, the substrate is dried only after contact with a final impregnation solution.

In embodiments, the substrate can be dried without heating (before a step of heating the impregnated substrate is commenced). Drying (without heating) can be affected by maintaining the impregnated substrate in a room temperature location, by subjecting the impregnated substrate to airflow, to a vacuum, or some combination thereof. Alternatively, the impregnated substrate can be dried during the heating step.

In embodiments, the substrate is typically not washed (with solvent for example) after impregnation because such a washing step(s) could remove impregnated species.

Whether the impregnated substrate is optionally dried or not, the next step is to heat the impregnated substrate. The impregnated substrate can be heated at atmospheric pressure in an inert gas or in a vacuum. Generally, the temperature to which the impregnated substrate is heated is sufficient to cause the zinc nitrate to be converted to zinc oxide, for example via thermal decomposition.

In embodiments, the impregnated substrate can be heated to a temperature of at least about 180° C., to a temperature of at least about 200° C., or to a temperature of at least about 300° C. In embodiments, the impregnated substrate can be heated to a temperature from about 140° C. to about 300° C. Heating to a temperature of at least about 180° C. functions to convert the zinc nitrate to zinc oxide. Heating to a temperature above about 300° C. can cause previously well distributed metals, metal oxides and salts to coalesce into clusters with larger mean crystallite dimension. The sorbents containing impregnant with larger mean crystallite dimension tend to have poorer (dry) gas removal capability since the surface area of the impregnant(s) available to react with the challenge gas has been reduced. In embodiments, the impregnated substrate can be heated to a temperature from about 140° C. to about 200° C. Heating can be accomplished in a multi-step or gradient type of heating step.

The heating is typically carried out in an inert atmosphere. An oven or a conveyer or a vessel could be used as the chamber where heating occurs. The inert atmosphere may comprise argon or nitrogen and mixtures thereof and less than about 2% oxygen by weight. The use of an inert atmosphere can assist in the thermal decomposition of the impregnant (for example, zinc nitrate) without damaging the activated particulate substrate.

Water may also be a desirable, optional impregnant in some embodiments. Water can be added to the impregnated substrate after it has been treated with other impregnants, such as the zinc oxide. Water impregnant can provide increasing filtering efficacy against acid gases, ammonia, and the like. When present, about 0.2 to 20 weight percent water based upon the total weight of the impregnated substrate material may be effective; in some embodiments, from about 1 to 5 weight percent water would be suitable based upon the total weight of the impregnated substrate material. Other suitable optional impregnants are described in "Military Problems with Aerosols and Non-persistent gases, Summary of Technical Report of Division 10", NDRC (1946), the entirety of which is incorporated herein by reference.

Once the filter media has been formed, it can be used to remove gaseous contaminants from an air stream. The gaseous contaminants that can be removed can include for example, compounds such as hydrogen cyanide (HCN), basic gases such as ammonia ($NH_3$), acid gases such as sulfur dioxide ($SO_2$) and organic vapors.

Filter media disclosed herein can include a substrate having zinc oxide particles disposed on at least a portion of the surface of the substrate. As used herein, zinc oxide particles can include individual particles of zinc oxide, an atomic monolayer or monolayers of zinc oxide, or a combination thereof. As used herein, the phrase "surface of the substrate" can include outer surfaces of the substrate, internal surfaces of the substrate, which can also be referred to as the surfaces of the pores of the substrate, or combinations thereof. In embodiments, the filter media can include zinc oxide particles disposed on at least portions of the outer surfaces of the substrate and at least portions of the internal surfaces of the substrate (i.e., within the pores).

In embodiments, the zinc oxide particles are particles having a relatively small size. In embodiments, the zinc oxide particles have an average crystallite dimension that is not greater than about 100 nm. In embodiments, the zinc oxide particles have an average crystallite dimension that is not greater than about 50 nm. In embodiments, the zinc oxide particles have an average crystallite dimension that is not greater than about 30 nm. In embodiments, the zinc oxide particles have an average crystallite dimension that is not greater than about 20 nm. In embodiments, the zinc oxide particles have an average crystallite dimension that is not greater than about 10 nm.

The average crystallite dimension of the zinc oxide particles can be measured using known methods. Exemplary methods that can be utilized to determine the average crystallite dimension of the zinc oxide particles include for example, x-ray diffraction (XRD), Scanning Electron Microscopy (SEM) and Transmission Electron Microscopy (TEM).

In embodiments, the average crystallite dimension of the zinc oxide particles can be determined using X-ray diffraction and the Scherrer equation. X-ray diffraction can be performed using a number of different X-ray diffractometers. For example a Rigaku MiniFlex X-ray diffractometer equipped with a Copper target X-ray tube was used. Typical operating values used can include a scan rate of 0.05°/step and a dwell time of 30 seconds/step. The Rigaku MiniFlex X-ray diffractometer uses variable slits to keep the size of the X-ray beam on the sample constant as the scattering angle is changed. A Phillips diffractometer equipped with a Copper target X-ray tube can also be used to conduct powder XRD experiments. The Phillips diffractometer uses fixed slits and can be coupled to an Inel CPS 120 curved detector. Typical scan conditions used for the Phillips diffractometer can include a dwell time of 1200 seconds per sample. The relatively long dwell times can ensure that good signal to noise ratio is obtained from the sample under investigation. This can provide adequate resolution of the impregnant diffraction peaks so the average crystallite dimensions of the impregnant can be calculated using the Scherrer equation. Prior to analysis samples can be ground to a powder using a mortar and pestle.

The data collected from the x-ray diffraction experiments can be analyzed using computer programs such as Microsoft excel, fityk, G-fit, Maple, Grapher or any other suitable program. Less exact estimates can be made by visual analysis of the data set when it is plotted as Intensity versus scattering angle. The mean crystallite dimension, L, of the impregnant can be calculated using the Scherrer equation from analysis of the diffraction peaks. The required inputs for the Scherrer equation are the wavelength of the incident x-ray radiation, the full width at half maximum (in radians) of the diffraction peak centered at the scattering angle of interest, B, and the value of the scattering angle of interest, $2\theta$. A fitting constant, K (=0.9), is generally used in the Scherrer equation as well. A detailed description of the Scherrer equation can be found in the literature, a relevant example being: H. P. Klug and L. E. Alexander, *X-ray Diffraction Procedures: For Polycrystalline and Amorphous Materials* (John Wiley & Sons, London, 1974). A form of the Scherrer equation that can be utilized herein is:

$$L = K\lambda / [B \cos(\theta)].$$

In embodiments, disclosed filter media can include an amount of zinc oxide that is sufficient to provide a desired level of filtering capacity for various air contaminants. In embodiments, disclosed filter media can include at least about 5%, at least 10%, at least 15%, at least 20%, or at least 25% by weight of zinc oxide based on the weight of the filter media. In embodiments, disclosed filter media can include between about 5% and about 30% by weight of zinc oxide based on the weight of the filter media. In embodiments, disclosed filter media can include between about 15% and about 25% by weight of zinc oxide based on the weight of the filter media. The amount of zinc oxide associated with filter media can be determined in a number of ways. For example, determining the amount of zinc oxide in the filter media can be based on the amount of zinc nitrate used to produce the zinc oxide. If the amount of zinc nitrate initially used is known, 100% conversion, or another value based on experimental results, can be utilized to determine the amount of zinc oxide present.

Substrates that have been formed into filter media can also be contacted with or formed into larger articles. For example, the filter media can be formed into a web or can be added to a web that is formed from a different material.

Disclosed filter media may be used alone or in conjunction with other gaseous filtering media. When used in conjunction with other gaseous filtering media, the two or more types of media may be intermixed and/or disposed in separate filter bed layers. The relative amounts of each kind of gaseous filtering particle can vary over a wide range. Examples of such filter constructions can be found, for example, in U.S. Pat. No. 6,344,071 to Smith et al and U.S. Pat. No. 5,714,126 to Frund.

FIG. 1 shows a respirator 10 that has a filter cartridge 12 attached to a mask body 14. The filter cartridge 12 can include one or more layers of the disclosed filter media. The respirator 10 also has a harness 16, which assists in supporting the mask body 14 over the nose and mouth of the wearer. The mask body 14 can include an elastomeric face-contacting portion 18 and a rigid structural portion 19. The filter cartridge 12 attaches to the rigid structural portion 19 and can be replaceable if desired.

As shown in FIG. 2, the filter cartridge 12 may include a scrim or cover web 20 that extends across the cartridge inlet. layer of an impregnated active particulate filter 22 is disposed between the cover web 20 and an outlet web 24 as a gaseous filtration layer, particularly suited for removing gas and vapor contaminants from air. The gaseous filtration layer 22 may be, for example, a packed bed, a bonded sorbent structure, an entangled structure, and/or an adhered structure. See, for example, U.S. Pat. No. 5,078,132 to Braun et al., U.S. Pat. No. 5,696,199 to Senkus et al., U.S. Pat. No. 6,234,171 to Springett et al. and US Patent Applications 2006/0254427 to Trend et al. and 2006/0096911 to Brey et al. Inhaled air thus passes sequentially through the cover web 20, the sorbent air filter 22, and the outlet scrim 24 to enter a plenum 26. From the plenum 26, the inhaled air then passes through an outlet 28 to enter the interior gas space where the purified air may be inhaled by the wearer. The filter cartridge 12 may include a removable attachment portion 30. The cartridge may be attached to the mask body using, for example, a snap-fit engagement mechanism as taught in U.S. Pat. No. RE39,493 to Yuschak et al. or it may be, for example, a bayonet or threaded attachment. The filter cartridge 12 also may include a particle filter, typically upstream to the activated carbon filter 22. The particle filter may be disposed between the cover web 20 and the sorbent layer 22 or it may be used in lieu of the cover web 20.

A particle filter may come in a variety of forms, an example of which is a nonwoven electrically-charged fibrous web. A particle filtration layer is typically chosen to achieve a desired filtering effect and, generally, removes a high percentage of particles suspended in the gaseous stream that passes through it. For fibrous particle filter layers, the fibers selected depend on the substance to be filtered and, typically, are chosen so that they do not become bonded together during the molding operation. The particle filter layer may come in a variety of shapes and forms but typically has a thickness of about 0.2 millimeters (mm) to 1 centimeter (cm), more typically about 0.3 mm to 0.5 cm, and it could be a generally planar web or it could be corrugated to provide an expanded surface area see, for example, U.S. Pat. Nos. 5,804,295 and 5,656,368 to Braun et al. The particle filtration layer also may include multiple filtration layers joined together by an adhesive or any other suitable means. Essentially any suitable material that is known (or later developed) for forming a particle filtering layer may be used for the filtering material. Webs of melt-blown fibers, such as those taught in Wente, Van A., *Superfine Thermoplastic Fibers*, 48 INDUS. ENGN. CHEM., 1342 et seq. (1956), especially when in a persistent electrically charged (electret) form are especially useful (see, for example, U.S. Pat. No. 4,215,682 to Kubik et al.). These melt-blown fibers may be microfibers that have an effective fiber diameter less than about 20 micrometers (µm) (referred to as BMF for "blown microfiber"), typically about 1 to 12 µm. Effective fiber diameter may be determined according to Davies, C. N., *The Separation Of Airborne Dust Particles*, INSTITUTION OF MECHANICAL ENGINEERS, London, Proceedings 1B, 1952. In embodiments, BMF webs that contain fibers formed from polypropylene, poly(4-methyl-1-pentene), or combinations thereof can be utilized. Electrically charged fibrillated-film fibers as taught in van Turnhout, U.S. Pat. No. Re. 31,285, also may be suitable, as well as rosin-wool fibrous webs and webs of glass fibers or solution-blown, or electrostatically sprayed fibers, especially in microfilm form. Electric charge can be imparted to the fibers by contacting the fibers with water as disclosed in U.S. Pat. No. 6,824,718 to Eitzman et al., U.S. Pat. No. 6,783,574 to Angadjivand et al., U.S. Pat. No. 6,743,464 to Insley et al., U.S. Pat. No. 6,454,986 and U.S. Pat. No. 6,406,657 to Eitzman et al., and U.S. Pat. No. 6,375,886 and U.S. Pat. No. 5,496,507 to Angadjivand et al. Electric charge also may be imparted to the fibers by corona charging as disclosed in U.S. Pat. No. 4,588,537 to Klasse et al. or by tribocharging as disclosed in U.S. Pat. No. 4,798,850 to Brown.

The cover web (inlet and outlet) typically does not provide any substantial filtering benefits to the particle filtering structure, although it can protect the particle filtration layer and may act as a pre-filter when disposed on the exterior (or upstream to) the particle filtration layer. The cover web may be fashioned to have a basis weight of about 5 to 50 $g/m^2$ (typically about 10 to 30 $g/m^2$). Fibers used in the cover web often have an average fiber diameter of about 5 to 24 micrometers, typically of about 7 to 18 micrometers, and more typically of about 8 to 12 micrometers.

Suitable materials for the cover web are blown microfiber (BMF) materials, particularly polyolefin BMF materials, for example polypropylene BMF materials (including polypropylene blends and also blends of polypropylene and polyethylene). A suitable process for producing BMF materials for a cover web is described in U.S. Pat. No. 4,013,816 to Sabee et al. The web may be formed by collecting the fibers on a smooth surface, typically a smooth-surfaced drum. Spunbond fibers also may be used.

A typical cover web may be made from polypropylene or a polypropylene/polyolefin blend that contains about 50 weight percent or more polypropylene. Polyolefin materials that are suitable for use in a cover web may include, for example, a single polypropylene, blends of two polypropylenes, and blends of polypropylene and polyethylene, blends of polypropylene and poly(4-methyl-1-pentene), and/or blends of polypropylene and polybutylene. One example of a fiber for the cover web is a polypropylene BMF made from the polypropylene resin "Escorene 3505G" from Exxon Corporation, providing a basis weight of about 25 $g/m^2$ and having a fiber denier in the range 0.2 to 3.1 (with an average, measured over 100 fibers of about 0.8). Another suitable fiber is a polypropylene/polyethylene BMF (produced from a mixture comprising 85 percent of the resin "Escorene 3505G" and 15 percent of the ethylene/alpha-olefin copolymer "Exact 4023" also from Exxon Corporation) providing a basis weight of about 25 $g/m^2$ and having an average fiber denier of about 0.8. Suitable spunbond materials are available, under the trade designations "Corosoft Plus 20", "Corosoft Classic 20" and "Corovin PP-S-14", from Corovin GmbH of Peine, Germany, and a carded polypropylene/viscose material available, under the trade designation "370/15", from J. W. Suominen OY of Nakila, Finland. Examples of cover webs that may be used herein are disclosed, for example, in U.S. Pat. No. 6,041,782 to Angadjivand, U.S. Pat. No. 6,123,077 to Bostock et al., and WO 96/28216A to Bostock et al.

EXAMPLES

Solution Preparation Methods

A solution that contained $HNO_3$ was prepared by diluting 70% concentrated reagent grade $HNO_3$ purchased from Sigma-Aldrich, St. Louis, Mo., USA, in distilled water.

A solution that contained $Zn(NO_3)_2$ was prepared by dissolving the desired amount of $Zn(NO_3)_2.6H_2O$ purchased from Sigma-Aldrich, St. Louis, Mo., USA in distilled water.

A solution that contained $Zn(NO_3)_2$ and a non-Cu metal was prepared by dissolving the desired amount of $Zn(NO_3)_2.6H_2O$ purchased from Sigma-Aldrich, St. Louis, Mo., USA and the desired amount of $Fe(NO_3)_3.9H_2O$ purchased from Sigma-Aldrich, St. Louis, Mo., USA in distilled water.

A solution that contained $Zn(NO_3)_2$ and a non-Cu metal was prepared by dissolving the desired amount of $Zn(NO_3)_2.6H_2O$ purchased from Sigma-Aldrich, St. Louis, Mo., USA and the desired amount of $H_3PO_4.12MoO_3.xH_2O$ purchased from Alfa Aesar, Ward Hill, Mass., USA in distilled water. The number of water molecules per complex, x, was determined by heating 45 mg of $H_3PO_4.12MoO_3.xH_2O$ in a TGA, in air, from room temperature to 600° C. at a scan rate of 5° C./min. Analysis of the data before and after heating allowed an estimate of $x=27\pm2$.

Impregnation Methods

The prepared solutions were dissolved in water to obtain solutions of the desired concentration. In single step processes, all of the solutions were mixed together and then used to impregnate the activated carbon. Activated carbon was then impregnated with enough salt solution to reach its imbibing limit. This allowed the granules to begin to stick together. After imbibing with the salt solution, the carbon was then dried at the noted temperature (s).

Gas Testing Methods

General:

Activated carbon substrates were tested "as received" or were preconditioned before testing by either drying at elevated temperature under argon or by humidifying to a constant mass in a chamber that contained a salt slurry that generated about 85% relative humidity (RH) environment. The salt-slurry included 500 grams (g) of KBr in 100 milliliters (ml) deionized (DI) water. Samples labeled "dry" were dried to constant mass and then tested with a less than 15% RH challenge gas stream. The challenge gas was air that included $SO_2$, $NH_3$, HCN or $C_6H_{12}$. Samples labeled as "wet" were humidified to constant mass and were then tested with an 80% RH challenge gas stream.

$SO_2$ Breakthrough Testing:

A small sample of impregnated carbon prepared according to a given example, equating to the volume of 0.75 g of Kuraray GC, was weighed out and transferred to a tube testing apparatus having the configuration shown in FIG. 3. The carbon was "tapped" until no significant reduction in volume was observed by the human eye. The carbon sample in the tube was then exposed to a test stream of 200 mL/min of conditioned air (<15% RH or 80% RH) containing 1000 parts per million (ppm) of sulfur dioxide ($SO_2$). The air downstream to the activated carbon sample was bubbled into 100 mL of scrubbing solution (which consisted of distilled water and about 0.5 g of KCl or NaCl). The pH of the scrubbing solution was monitored using a pH electrode for $SO_2$ breakthrough. The breakthrough time was defined as the time at which a concentration of 36 ppm $SO_2$ was observed downstream to the carbon sample.

$NH_3$ Breakthrough Testing:

A small sample of impregnated carbon prepared according to a given example, equating to the volume of 0.75 g of Kuraray GC, was weighed out and transferred the tube testing apparatus shown in FIG. 3. The carbon was "tapped" until no significant reduction in volume was observed by the human eye. The carbon sample in the tube was then exposed to a test stream of 200 mL/min of conditioned air (<15% RH or 80% RH) containing 1000 ppm of ammonia ($NH_3$). The air downstream to the carbon sample was bubbled into 100 mL of scrubbing solution (which consisted of distilled water and about 0.5 g of KCl or NaCl). The pH of the scrubbing solution was monitored using a pH electrode for $NH_3$ breakthrough. The breakthrough time was defined as the time at which a concentration of 3.6 ppm is observed downstream to the carbon sample.

HCN Breakthrough Testing:

A small sample of impregnated carbon prepared according to a given example, equating to the volume of 0.75 g of Kuraray GC was weighed out and transferred to a tube testing apparatus similar to the apparatus shown in FIG. 3 but with a gas chromatograph with a flame ionization detector (GC-FID). The carbon was "tapped" until no significant reduction in volume was observed to the human eye. The carbon sample in the tube was then exposed to a test stream of approximately 260 mL/min of conditioned air (<15% RH or 80% RH) that contained about 2000 ppm of hydrogen cyanide (HCN). The air downstream to the carbon sample was monitored for breakthrough using a GC-FID system for both HCN, the challenge gas, and cyanogen (NCCN), a common decomposition product of HCN. The breakthrough time was defined as the time at which a concentration of 5 ppm was observed downstream to the carbon sample.

$C_6H_{12}$ Breakthrough Testing:

A small sample of impregnated carbon prepared according to a given example, equating to the volume of 0.75 g of Kuraray GC, was weighed out and transferred the tube testing apparatus shown in FIG. 3. The carbon was "tapped" until no significant reduction in volume was observed by the human eye. The carbon sample in the tube was then exposed to a test stream of 200 mL/min of conditioned air (<15% RH or 80% RH) containing 2000 ppm of cyclohexane ($C_6H_{12}$). The air downstream to the carbon sample was monitored for breakthrough using an Miran SapphIRe IR. The breakthrough time was defined as the time at which a concentration of 5 ppm is observed downstream of the carbon sample.

Example 1

Activated carbon, type 12×35 Kuraray GC available from Kuraray Chemical Co., Ltd., Osaka, Japan, was used as the substrate. The final impregnation solution was prepared by mixing an acidic solution containing 4 molar (moles per liter: "M") $HNO_3$ in distilled water with the metals salts to achieve concentrations of 2.4 M $Zn(NO_3)_2$. The carbon and the impregnating solution were combined at a ratio of 1 g:0.8 mL. This mixture was then dried in an argon atmosphere for approximately 3 hours at a temperature of 160° C.

Example 2

Activated carbon, type 12×35 Kuraray GC available from Kuraray Chemical Co., Ltd., Osaka, Japan, was used as the substrate. The final impregnation solution was prepared by mixing an acidic solution containing 0.5 molar (moles per liter: "M") $HNO_3$ in water with the metals salts to achieve concentrations of 2.4 M $Zn(NO_3)_2$. The carbon and the impregnating solution were combined at a ratio of 1 g:0.8 mL. This mixture was then dried in an argon atmosphere for 3 hours at a temperature of 160° C.

Example 3

A sample of Kuraray GC activated carbon, type 12×35 Kuraray GC, available from Kuraray Chemical Co., Ltd., Osaka, Japan was impregnated in a two step process. First a sample of the carbon was impregnated with a 1.2 M $Zn(NO_3)_2$, 0.018M $H_3PO_4.12MoO_3$ and 2.0M $HNO_3$ aqueous solution at a ratio of 0.7 mL of the impregnating solution for each gram of the activated carbon. The impregnated carbon was dried in an inert atmosphere for 2 hours at 125° C. This treated carbon was then impregnated with 0.7 mL of a second aqueous solution that was 1.2 M $Zn(NO_3)_2$, 0.018M $H_3PO_4.12MoO_3$ and 2.0M $HNO_3$ for each g of treated activated carbon. The twice impregnated carbon was dried in under argon for 2 hours at a temperature of 200° C.

Example 4

Activated carbon, type 12×35 Kuraray GC available from Kuraray Chemical Co., Ltd., Osaka, Japan, was used as the substrate. The final impregnation solution was prepared by dissolving $Zn(NO_3)_2.6H_2O$ in distilled water. The metals salts achieved a concentrations of 2.4 M $Zn(NO_3)_2$. The carbon and the impregnating solution were combined at a ratio of 1 g:0.8 mL. This mixture was then dried in an argon atmosphere for 2 hours at a temperature of 160° C.

Example 5

Example 5 was prepared as described in Example 1 except the impregnating solution and activated carbon mixture was dried in an argon atmosphere for 3 hours at a temperature of 180° C.

Example 6

Example 6 was prepared as described in Example 2 except the impregnating solution and activated carbon mixture was dried in an argon atmosphere for 3 hours at a temperature of 180° C.

Example 7

Example 7 was prepared as described in Example 4 except the impregnating solution and activated carbon mixture was dried in an argon atmosphere for 2 hours at a temperature of 180° C.

Example 8

Example 8 was prepared as described in Example 1 except the impregnating solution and activated carbon mixture was dried in an argon atmosphere for 3 hours at a temperature of 200° C.

Example 9

Example 9 was prepared as described in Example 2 except the impregnating solution and activated carbon mixture was dried in an argon atmosphere for 3 hours at a temperature of 200° C.

Example 10

Example 10 was prepared as described in Example 4 except the impregnating solution and activated carbon mixture was dried in an argon atmosphere for 2 hours at a temperature of 200° C.

Example 11

Example 11 was prepared as described in Example 1 except the impregnating solution and activated carbon mixture was dried in an argon atmosphere for 3 hours at a temperature of 250° C.

Example 12

Example 12 was prepared as described in Example 2 except the impregnating solution and activated carbon mixture was dried in an argon atmosphere for 3 hours at a temperature of 250° C.

Example 13

Activated carbon, type 12×35 Kuraray GC available from Kuraray Chemical Co., Ltd., Osaka, Japan, was used as the substrate. The final impregnation solution was prepared by dissolving $Zn(NO_3)_2 \cdot 6H_2O$ in distilled water. The metals salts achieved a concentrations of 2.4 M $Zn(NO_3)_2$. The carbon and the impregnating solution were combined at a ratio of 1 g:0.8 mL. This mixture was then dried in an argon atmosphere for 3 hours at a temperature of 300° C.

Example 14

Example 14 was prepared as described in Example 1 except the impregnating solution and activated carbon mixture was dried in an argon atmosphere for 3 hours at a temperature of 300° C.

Example 15

Example 15 was prepared as described in Example 2 except the impregnating solution and activated carbon mixture was dried in an argon atmosphere for 3 hours at a temperature of 300° C.

Example 16

Example 16 was prepared as described in Example 1 except the impregnating solution and activated carbon mixture was dried in an argon atmosphere for 3 hours at a temperature of 450° C.

Example 17

Example 17 was prepared as described in Example 13 except the impregnating solution and activated carbon mixture was dried in an argon atmosphere for 3 hours at a temperature of 450° C.

Example 18

Activated carbon, type 12×35 Kuraray GC available from Kuraray Chemical Co., Ltd., Osaka, Japan, was used as the substrate. The final impregnation solution was prepared by mixing an acidic solution containing 4 molar (moles per liter: "M") $HNO_3$ in distilled water with the metals salts to achieve concentrations of 1.2 M $Zn(NO_3)_2$ and 1.2M $Fe(NO_3)_3$. The carbon and the impregnating solution were combined at a ratio of 1 g:0.8 mL. This mixture was then dried in an argon atmosphere for approximately 3 hours at a temperature of 180° C.

Example 19

Example 19 was prepared as described in Example 1 except the activated carbon used was CDND 1230 from Calgon Carbon Corporation, Pittsburgh, Pa. Also the impregnating solution and activated carbon mixture was dried in an argon atmosphere for 3 hours at a temperature of 180° C.

Example 20

Activated carbon, type 12×35 Kuraray GC available from Kuraray Chemical Co., Ltd., Osaka, Japan, was used as the substrate. The final impregnation solution was prepared by mixing distilled water with the metals salts to achieve concentrations of 1.2 M $Zn(NO_3)_2$ and 1.2M $Fe(NO_3)_3$. The carbon and the impregnating solution were combined at a ratio of 1 g:0.8 mL. This mixture was then dried in an argon atmosphere for approximately 3 hours at a temperature of 180° C.

Example 21

Activated carbon, CDND 1230 from Calgon Carbon Corporation, Pittsburgh, Pa. was used as the substrate. The final impregnation solution was prepared by mixing distilled water with the metals salts to achieve concentrations of 2.4 M $Zn(NO_3)_2$. The carbon and the impregnating solution were combined at a ratio of 1 g:0.8 mL. This mixture was then dried in an argon atmosphere for approximately 3 hours at a temperature of 180° C.

Example 22

Activated carbon, NUCHAR WV-B 10×25 mesh from Westvaco Chemical Division, Covington, Va. was used as the substrate. The final impregnation solution was prepared by mixing distilled water with the metals salts to achieve concentrations of 2.4 M $Zn(NO_3)_2$. The carbon and the impregnating solution were combined at a ratio of approximately 1 g:0.8 mL. This mixture was then dried in an argon atmosphere for approximately 3 hours at a temperature of 180° C.

Example 23

Activated carbon, NUCHAR WV-B 10×25 mesh from Westvaco Chemical Division, Covington, Va. was used as the substrate. The final impregnation solution was prepared by mixing an acidic solution containing 4 molar (moles per liter: "M") $HNO_3$ in distilled water with the metals salts to achieve concentrations of 2.4 M $Zn(NO_3)_2$. The carbon and the impregnating solution were combined at a ratio of approximately 1 g:0.9 mL. This mixture was then dried in an argon atmosphere for approximately 3 hours at a temperature of 180° C.

Example 24

Activated carbon, NUCHAR WV-B 10×25 mesh from Westvaco Chemical Division, Covington, Va. was used as the substrate. The final impregnation solution was prepared by mixing distilled water with the metals salts to achieve concentrations of 1.2 M $Zn(NO_3)_2$ and 1.2 M $Fe(NO_3)_3$. The carbon and the impregnating solution were combined at a ratio of approximately 1 g:1 mL. This mixture was then dried in an argon atmosphere for approximately 3 hours at a temperature of 180° C.

Example 25

Activated carbon, type 12×35 Kuraray GC available from Kuraray Chemical Co., Ltd., Osaka, Japan, was used as the substrate. The final impregnation solution was prepared by dissolving $Zn(NO_3)_2.6H_2O$ in distilled water. The metals salts achieved a concentrations of 2.3 M $Zn(NO_3)_2$. The carbon and the impregnation solution were combined at a ratio of 1 g:0.8 mL. This mixture was then dried in air for 5 hours at a temperature of 140° C.

The samples of Examples 1-25 were challenged with vapors or gases using the test methods described above. The test results are shown below in Table 1 along with test results from commercially available Calgon URC, a Whetlerite multigas carbon prepared using copper and molybdenum salts and samples reproduced from U.S. Pat. No. 7,309,513 which describes another copper based Whetlerite type multigas carbon where the expensive molybdenum salts have been replaced with tungsten salts.

TABLE 1

Dry Breakthrough Test Results

| Patent or Example # | Weight % loading (±2%) | Breakthrough time (min.) | | | | |
|---|---|---|---|---|---|---|
| | | $C_6H_{12}$ (±10%) | $SO_2$ (±10%) | $NH_3$ (±10%) | HCN (±6%) | NCCN[2] (±6%) |
| Kuraray GC | N/A | 158 | 24 | 5 | 3 | N |
| Calgon URC[1] | ~30 | 111 | 72 | 110 | 86 | 72 |
| Calgon URC[1,2] | ~30 | 114 | 46 | 60 | 77 | 58 |
| C2 U.S. Pat. No. 7,309,513 | | 87 | 53 | 100 | 67 | 24 |
| C2 U.S. Pat. No. 7,309,513[2] | | 86 | 36 | 52 | N/A | N/A |
| 1 | 21 | 139 | 87 | 79 | 55 | N |
| 2 | 18 | 133 | 72 | 42 | 41 | N |
| 3 | 23 | 122 | 71 | 96 | 41 | N |
| 4 | 18 | 139 | 70 | 56 | 35 | N |
| 5 | 19 | 130 | 81 | 84 | 57 | N |
| 6 | 17 | 145 | 67 | 44 | 48 | N |
| 7 | 17 | 149 | 71 | 45 | 33 | N |
| 8 | 19 | 123 | 86 | 69 | 52 | N |
| 9 | 17 | 126 | 71 | 44 | 33 | N |
| 10 | 23 | 155 | 66 | 48 | 40 | N |
| 11 | 13 | 125 | 73 | 62 | 38 | N |
| 12 | 15 | 149 | 64 | 39 | 36 | N |
| 13 | 16 | 147 | 53 | 32 | 27 | N |
| 14 | 15 | 159 | 49 | 37 | 28 | 40 |
| 15 | 16 | 129 | 54 | 30 | 27 | N |
| 16 | 12 | 149 | 25 | 33 | 14 | N |
| 17 | 12 | 160 | 25 | 13 | 11 | N |
| 18 | 19 | 153 | 55 | 56 | 38 | N |
| 19 | 18 | 102 | 56 | 48 | 34 | N |
| 20 | 18 | 133 | 55 | 42 | 34 | N |
| 21 | 16 | 117 | 49 | 29 | 30 | N |
| 22 | 21 | 63 | 44 | 46 | 16 | 25 (1.5 ppm) |
| 23 | 20 | 49 | 40 | 62 | 29 | N |
| 24 | 25 | 54 | 33 | 57 | 22 | N |
| 25 | 20 | 121 | 87 | 120 | 42 | N |

[1]Calgon URC, commercially available from Calgon Carbon Company, Pittsburgh, PA, USA
[2]Sample was dried at approximately 120° C. in air prior to testing to reduce moisture content.
[3]For samples where no NCCN was observed to be generated during HCN testing, NCCN breakthrough time is listed as N.

TABLE 2

Wet Breakthrough Test Results

| Patent or Example # | Breakthrough time (min.) | | | | |
|---|---|---|---|---|---|
| | $C_6H_{12}$ (±10%) | $SO_2$ (±10%) | $NH_3$ (±10%) | HCN (±6%) | NCCN[2] (±6%) |
| GC | 23 | 106 | 15 | 4 | N |
| Calgon URC[1] | 12 | 179 | 225 | 107 | 90 |
| 1 | 4 | 112 | 144 | 38 | 28 (2 ppm) |
| 2 | 6 | 153 | 123 | 58 | 62 (3.5 ppm) |
| 5 | 4 | 120 | 153 | 44 | N |
| 8 | 4 | 122 | 140 | 44 | 44 (4 ppm) |
| 9 | 7 | 98 | 71 | 44 | 28 |
| 13 | 5 | 122 | 54 | 49 | N |
| 14 | 3 | 110 | 100 | 37 | N |
| 16 | 5 | 124 | 66 | 54 | 60 |
| 18 | 3 | 141 | 111 | 18 | N |
| 19 | 5 | 125 | 83 | 48 | N |
| 20 | 4 | 154 | 71 | 25 | N |

TABLE 2-continued

Wet Breakthrough Test Results

| | Breakthrough time (min.) | | | | |
|---|---|---|---|---|---|
| Patent or Example # | $C_6H_{12}$ (±10%) | $SO_2$ (±10%) | $NH_3$ (±10%) | HCN (±6%) | $NCCN^2$ (±6%) |
| 21 | 11 | 118 | 56 | 56 | N |
| 24 | 1 | 56 | 90 | 10 | N |

[1]Calgon URC, commercially available from Calgon Carbon Company, Pittsburgh, PA, USA.
[2]Sample was dried at approximately 120° C. in air prior to testing and humidification.
[3]For samples where no NCCN was observed to be generated during HCN testing, NCCN breakthrough time is listed as N.

Figure 4:
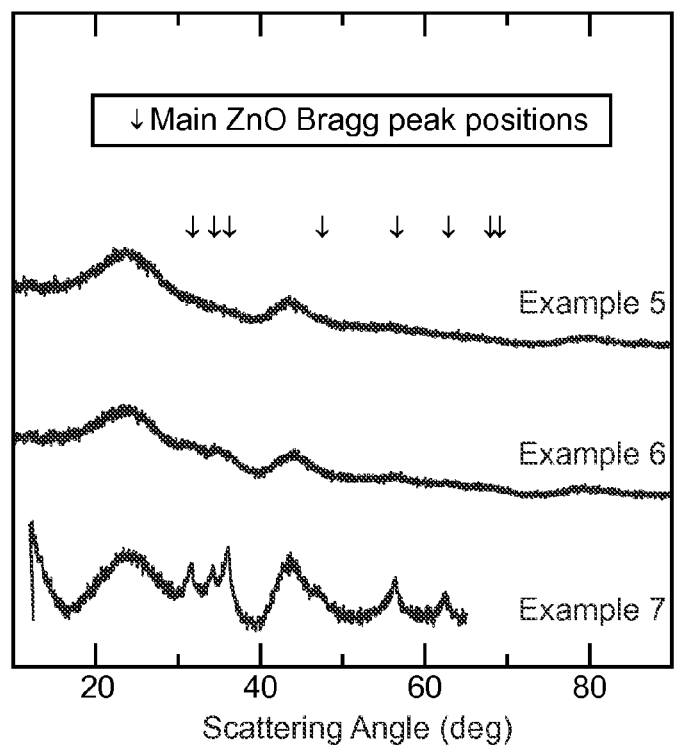
FIG. 4 shows X-ray diffraction patterns obtained from Examples 7, 6, and 5.

FIG. 4 shows X-ray diffraction patterns obtained from Examples 7, 6, and 5. The samples were heated (in argon) to $T_f$=180° C. This figure shows that as the concentration of $HNO_3$ in the impregnating solution is increased, the relative intensity of the ZnO diffraction peaks decreases and broadens, which is indicative of decreasing ZnO mean crystallite dimension as can be inferred from the Scherrer equation.

Figure 5:
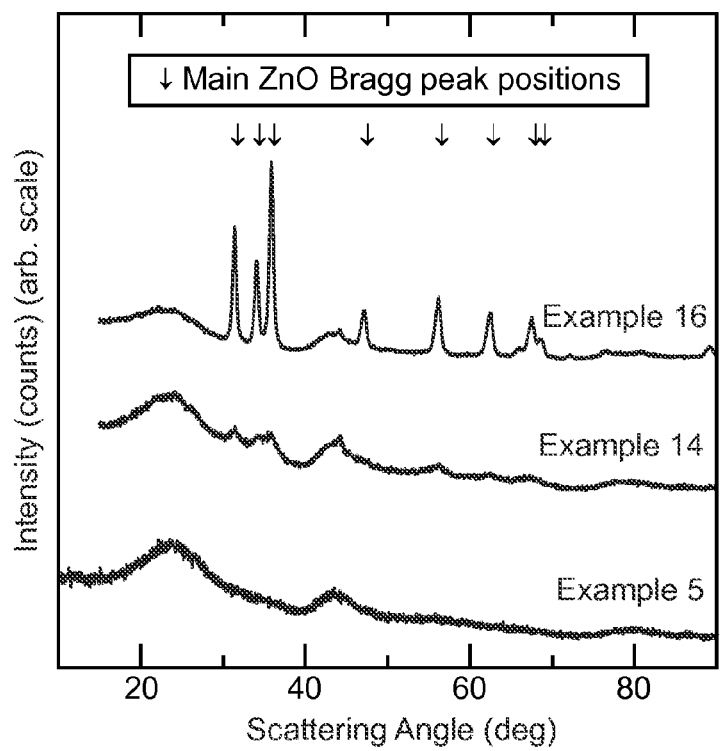
FIG. 5 shows X-ray diffraction patterns obtained from Examples 5, 14, and 16.

FIG. 5 shows X-ray diffraction patterns obtained from samples prepared from 2.4M $Zn(NO_3)_2$/4M $HNO_3$ impregnating solution. The samples were heated (in argon) to $T_f$=180° C. (Example 5), 300° C. (Example 14) and 450° C. (Example 16) respectively. The average ZnO impregnant grain size for these samples was calculated using the Scherrer equation and the data between scattering angles of approximately 30° and 40°. The average impregnant grain size was ≤2 nm (Example 5), (6±3) nm (Example 14) and (16±1) nm (Example 16).

Thus, embodiments of ZINC OXIDE CONTAINING FILTER MEDIA AND METHODS OF FORMING THE SAME are disclosed. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. A method of making a filter media, the method comprising:
   providing an impregnation solution comprising zinc nitrate and nitric acid;
   contacting a substrate with the impregnation solution to impregnate the zinc nitrate on the substrate; and
   heating the impregnation solution to convert the zinc nitrate to zinc oxide particles that have an average crystallite dimension not greater than about 50 nm.

2. The method of claim 1, wherein the impregnation solution comprises the nitric acid at a concentration of at least about 0.5 M.

3. The method of claim 2, wherein the nitric acid has a concentration of at least about 2.0 M.

4. The method of claim 1 further comprising contacting the substrate with a second impregnation solution.

5. The method of claim 4 further comprising contacting the substrate with a high molecular weight amine.

6. The method of claim 4, wherein the high molecular weight amine is triethylenediamine (TEDA).

7. The method of claim 1, wherein the impregnating solution additionally comprises a non-zinc salt.

8. The method of claim 7, wherein the non-zinc salt is $Fe(NO_3)_3$.

9. The method of claim 1, wherein the impregnating solution comprises $Cu(NO_3)_2$, $CuCl_2$, $Fe(NO_3)_3$, $Al(NO_3)_3$, $FeCl_2$, $FeCl_3$, $Ca(NO_3)_2$, $ZnCl_2$, Zinc acetate, Copper acetate or combinations thereof.

10. The method of claim 1 further comprising drying the impregnated substrate before heating.

11. The method of claim 1, wherein the impregnated substrate is heated to about 180° C. to about 300° C.

12. The method of claim 2, wherein the method is carried out in one step.

13. A method of making a filter media, the method comprising the steps of:
   contacting a substrate with an impregnation solution that comprises zinc nitrate and nitric acid; and
   heating the contacted substrate to cause zinc oxide particles that have an average crystallite dimension not greater than about 50 nm to be formed on the substrate.

14. The method of claim 13, wherein the filter media has at least about 5 percent of zinc oxide based on the weight of the filter media.

15. The method of claim 13, wherein the filter media has at least about 10 percent of zinc oxide based on the weight of the filter media.

16. The method of claim 13, wherein the filter media has at least about 15 percent of zinc oxide based on the weight of the filter media.

17. The method of claim 13, wherein the filter media has at least about 20 percent of zinc oxide based on the weight of the filter media.

18. The method of claim 13, wherein the filter media has 15 to 25 percent of zinc oxide based on the weight of the filter media.

19. The method claim 14, wherein the substrate comprises activated carbon, and wherein the filter media is placed in a filter cartridge.

20. A method of making a respirator, which comprises attaching the filter cartridge of claim 19 to a mask body.

* * * * *

UNITED STATES PATENT AND TRADEMARK OFFICE
CERTIFICATE OF CORRECTION

PATENT NO.         : 8,753,434 B2
APPLICATION NO.    : 14/051634
DATED              : June 17, 2014
INVENTOR(S)        : Croll et al.

It is certified that error appears in the above-identified patent and that said Letters Patent is hereby corrected as shown below:

In the Specification:

<u>Column 5</u>

Line 28, delete "polyoxometallates" and insert -- polyoxometalates --, therefor.

Line 51, delete "polyoxometallate" and insert -- polyoxometalate --, therefor.

Line 56, delete "silicotugstate" and insert -- silicotungstate --, therefor.

In the Claims:

<u>Column 20</u>

Line 45, in Claim 19, delete "method" and insert -- method of --, therefor.

Signed and Sealed this
Seventh Day of October, 2014

Michelle K. Lee
*Deputy Director of the United States Patent and Trademark Office*